United States Patent [19]

Fuchs

[11] Patent Number: 4,802,680
[45] Date of Patent: Feb. 7, 1989

[54] COAXIAL COLLET CHUCK

[75] Inventor: Volker Fuchs, Ottobrunn, Fed. Rep. of Germany

[73] Assignee: Siemens Aktiengesellschaft, Berlin and Munich, Fed. Rep. of Germany

[21] Appl. No.: 21,793

[22] Filed: Mar. 4, 1987

[30] Foreign Application Priority Data

Mar. 21, 1986 [DE] Fed. Rep. of Germany ....... 3609723

[51] Int. Cl.⁴ ............................................. B23B 31/02
[52] U.S. Cl. ........................................ 279/33; 279/35; 279/41 R; 279/46 R; 279/106; 279/110; 269/254 R; 269/287
[58] Field of Search .................. 279/1 T, 33, 34, 35, 279/46 R, 41 R, 106, 109, 110; 269/254, 287, 903

[56] References Cited

U.S. PATENT DOCUMENTS

| | | | |
|---|---|---|---|
| 2,407,908 | 9/1946 | Ventres | 279/41 |
| 2,762,630 | 9/1956 | Coniglio | 279/33 |
| 3,232,629 | 1/1966 | Obear | 279/106 |
| 3,247,624 | 4/1966 | Denton | 269/287 |
| 3,685,844 | 8/1972 | Sykes | 279/110 |
| 3,834,720 | 9/1974 | Parsons | 279/110 |

FOREIGN PATENT DOCUMENTS

| | | | |
|---|---|---|---|
| 1142973 | 9/1957 | France | 279/33 |
| 86048 | 8/1920 | Switzerland | 269/254 R |
| 848163 | 7/1981 | U.S.S.R. | 279/5 |

Primary Examiner—Gil Weidenfeld
Assistant Examiner—Daniel W. Howell
Attorney, Agent, or Firm—Hill, Van Santen, Steadman & Simpson

[57] ABSTRACT

A coaxial collect truck is disclosed having at least two clamping jaws which are radially adjustable by a respective chuck lever, whereby every chuck lever is connected to a respective stationary base part at one end by a first spring joint and is connected to a set collar at its other end by a second spring joint. The set collar is capable of engaging and releasing the clamping jaws by being rotatably seated at the base part by a respective third spring joint. Coaxial clamping in the sub-micrometer range is thereby achieved for precision round parts, particularly of plug pins for the releasable connection of optical fibers of light waveguides, whereby all chuck levers, base parts, first, second and third spring joints as well as the set collar are fashioned of one piece from a common plate.

12 Claims, 3 Drawing Sheets

COAXIAL COLLET CHUCK

BACKGROUND OF THE INVENTION

The invention relates to a coaxial collet chuck comprising at least two, preferably three clamping jaws which can be adjusted in radial direction and can be adjusted in common together.

In optical communications transmission systems using light waveguides, the optical fibers are coupled by ultra-high-precision mechanical plug connectors so that the two signal-carrying fiber cores coaxially meet one another with a precision which is within the sub-micrometer range. Thus, the connector causes a minimum signal attenuation. Accordingly, the core must be adjusted coaxially relative to the outside diameter of a plug pin of the connector with the greatest possible precision when mounting an optical fiber in the plug pin.

Up to now, the outside diameter of the plug pin during adjustment was held in a precise position by a bushing or a prism type clamp or chuck having prism shaped jaws which establish a point contact between the jaws and the plug pin. However, the diameters of these bushings are subject to fluctuations which in turn lead to dislocations between the plug pin and the core. Additionally, a prism type clamp may provide a translational dislocation between the plug pin and the core which can be identified under given conditions. Furthermore, improper plug pin diameter measurements, undetected deviations in the roundness of the plug pins, as well as high local surface pressures produced by the clamps all provide dislocations which are virtually uncontrollable.

In mechanical plug connectors, the position of the plug pin is defined by the enveloping cylinder of the plug pin which surrounds the plug pin during plugging. For this reason, the enveloping cylinder of a plug pin should be consulted as a reference for the adjustment of the optical fibers. This means that the plug pin should be accepted in a clamp unit having as large an area as possible, whereby the movement of the clamping jaws must be absolutely uniform in order to guarantee a coaxial adjustment having sub-micrometer precision within the prescribed diameter range. However, movements having the required precision cannot be realized with traditional coaxial collet chucks.

SUMMARY OF THE INVENTION

Therefore, the object of the present invention is to create a coaxial collet chuck which, given absolutely uniform movement of the clamping jaws, enables a coaxial adjustment or chucking of plug pins for use with releasable plug connectors of optical fiber light waveguides which is capable of having a sub-micrometer precision.

The coaxial collet chuck of the present invention provides the required precision by providing a chuck which is fashioned from one piece from a common plate having at least two clamping jaws which are adjustable and movable in common in a radial direction by respective chuck levers having a first end connected to each clamping jaw respectively on one side thereof and being connected to a stationary base part by a first spring joint on the other side of each chuck lever. Each of the chuck levers is further connected to a set collar by a second spring joint at its second end opposite said first end with the set collar being connected to the stationary base part by a third spring joint which provides a rotatable seating of the set collar to in turn provide common clamping and releasing of the clamping jaws.

The invention is based on the contention that movements having the required precision can only be realized by a leaf spring system which is fabricated of one piece. Only in this way can chucking imprecisions of the spring joints be avoided and absolutely identical properties of mutually corresponding spring joints be achieved. The chuck or compression levers are thereby rotatably seated in first spring joints relative to stationary base parts so that they are entrained with a rotational movement of the set collar by second spring joints or articulations and are thus opened or closed. The set collar itself is rotationally seated with respect to the base parts by third spring joints or articulations so that an absolutely precise and dislocation-free movement of the set collar is guaranteed.

The clamping jaws are preferably applied of one piece to the allocated chuck lever with a lower thickness in comparison to the thickness of the remainder of the chuck or common plate. The single-piece nature thereby guarantees the required precision. On the other hand, the clamping jaws can be formed by a hard metal insert which is rigidly affixed to the thinner portion of the common plate, so that high dimensional precision and wear resistance of the clamping jaws is guaranteed by employing the hard metal.

In accordance with a preferred embodiment of the invention, the base parts are rigidly screwed to a common base plate and are arranged at a slight distance to each other. The common base plate thereby guarantees the mechanical cohesion of the coaxial collet chuck during manipulation without deterioration of the function of the extremely sensitive coaxial collet chuck.

In the preferred embodiment of the present invention the chuck levers, base parts, first, second and third spring joints or articulations as well as the set collar are fashioned from the common plate by parting slots or slits. Such parting slots or slits can be introduced into the common plate with the required precision in a simple way by means of wire erosion.

Further, it is particularly beneficial when the first spring joints or articulations are respectively formed by two bores or apertures introduced into the common plate. These bores then combine with the parting slots to provide elastically performable joints for the chuck levers. What is thereby of decisive significance is that the bores can be introduced into the common plate with extreme precision so that the first spring joints or the second spring joints can thus maintain a correspondingly high precision as well as providing reproducibility of the force/path behavior.

The third spring joints are preferably formed by four bores introduced by pairs into the common plate. The resulting high-precision double joints have proven particularly suitable for the precise movement of the set collar.

It has turned out to be particularly beneficial to divide the second spring joints and the third spring joints respectively into upper and lower individual joints by recesses or cut outs introduced into the cross-section of the common plate. A flatter spring characteristic given approximately identical stability properties of the overall second and third spring joints is achieved by means of t his measure.

In accord with the preferred embodiment of the invention, the chuck levers are fashioned in a curved shape such that the allocated first spring joints, the rotational center of the set collar and the allocated second spring joints lie at least approximately on a straight line. As a result of this curved shape of the chuck levers, the difference of the two arc movements at the location of the second spring joint is at a minimum. Over and above this, the curved chuck lever additionally acts as a compensating element.

It is particularly beneficial for a simple manipulation of the coaxial collet chuck to have an actuation lever attached to the set collar, where the range of motion of this actuation lever is limited by laterally arranged detents or stop members. An overload of the sensitive spring joints can then be reliably prevented by means of the detents or stop members.

Reproduceable conditions when chucking precision round parts are assured in a simple way since a clamping force is exerted by a spring affixed to the actuation lever. A prestressing of all first, second and third spring joints which may be potentially present can then also be compensated in a simple way by an opposing spring affixed to the other side of the actuation lever.

An exemplary embodiment of the invention is shown in the drawings and shall be set forth in greater detail below.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
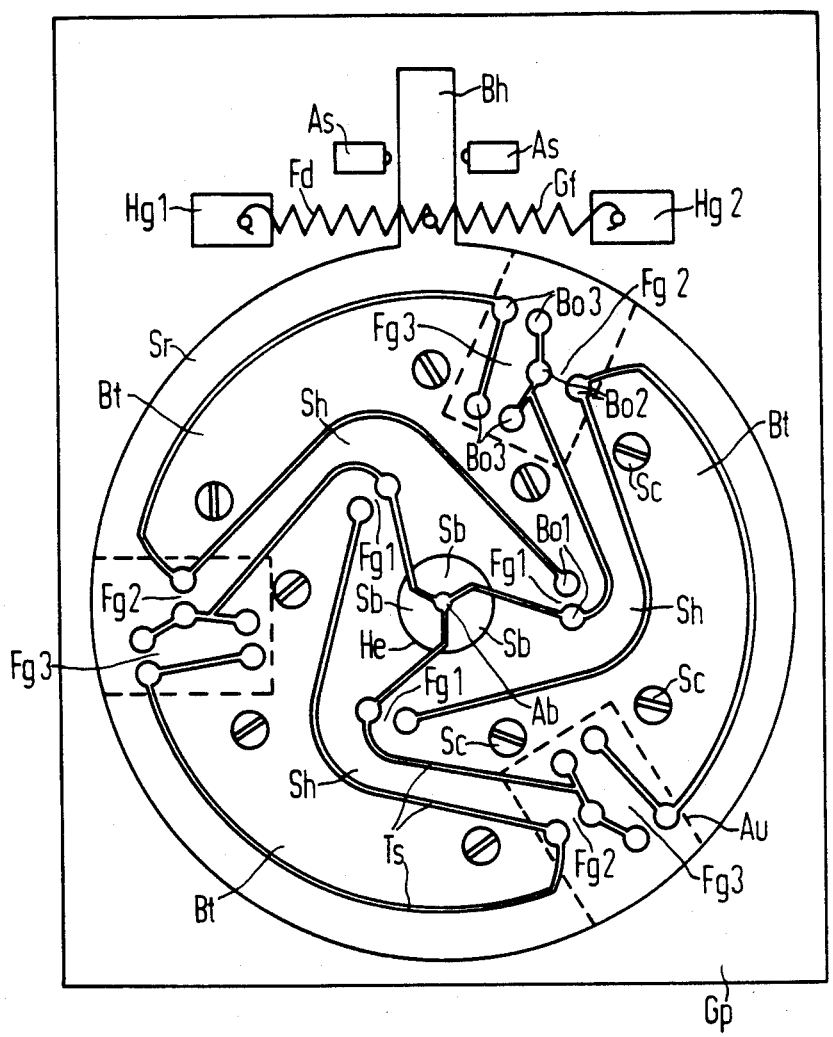
FIG. 1 is a plan view of a precision coaxial collet chuck of the present invention.

FIG. 1 shows a plan view of a precision coaxial collet chuck fashioned as a three-jaw collet chuck. A plurality of parting slots Ts as well as bores Bo1, Bo2 and Bo3 are thereby introduced into a common plate so that a total of three curved chuck levers Sh, three base parts Bt, three first spring joints Fg1, three second spring joints Fg2, three third spring joints Fg3 as well as an outer set collar Sr are formed from the plate. The parting slots Ts have been produced by wire erosion and have a slot width of, for example, 0.5 mm. A hard metal insert He may be seen affixed to each chuck lever Sh in the central region of the coaxial collet chuck. This hard metal insert He is applied to a portion of the common plate which is thinned from the normal 14 mm thickness of the common plate to 8 mm whereby the hard metal insert He is rigidly connected to the thinned portion of the common plate lying beneath it. The segments fashioned layer-wise in this way form a total of three clamping jaws Sb, whereby the middle acceptance bore for the coaxial chucking of precision round parts is referenced Ab.

Figure 3:
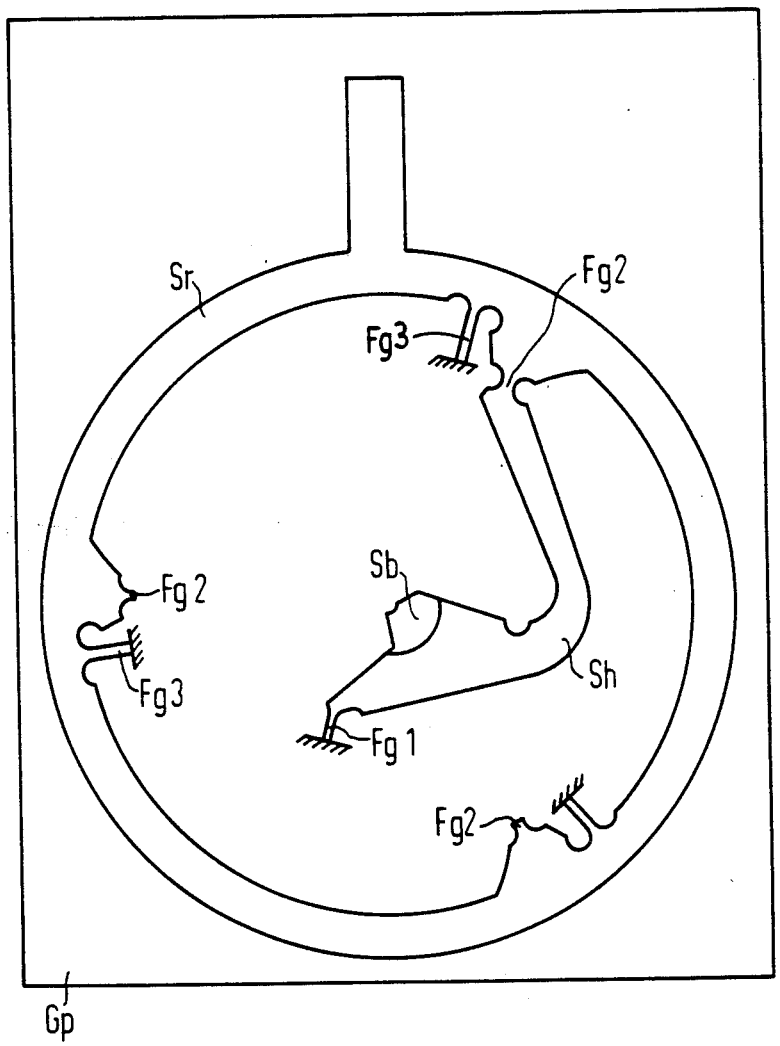
FIG. 3 is an illustration similar to FIG. 1 which serves only for the purpose of explanation and isolates a single chuck lever.

Every chuck lever Sh is rotatably seated in a first spring joint Fg1 so that, given a rotational movement of the set collar Sr, it is entrained via the allocated second spring joint Fg2 and provides an opening or closing of the corresponding clamping jaw Sb. This functioning of a chuck lever Sh may be particularly seen from FIG. 3 in which the first spring joint Fg1 s shown in a purely schematic fashion. It may be seen without further ado that, given clockwise rotation of the set collar Sr rotatably seated at the third spring joints Fg3 which are likewise schematically shown, the allocated clamping jaw Sb is opened in radial direction and is closed in radial direction given a rotation of the set collar Sr in a counter-clockwise direction. It may likewise be seen that the illustrated chuck lever Sh is curved such that the first spring joint Fg1, the rotational center of the set collar Sr and the second spring joint Fg2 lie on a straight line. This form of the chuck lever Sh assures that the difference of the two arc motions at the location of the second spring joint Fg2 becomes a minimum.

In accord with FIG. 1, the overall precision coaxial collet chuck is arranged on a rectangular base plate Gp, whereby every base part Bt is screwed firmly to the base plate Gp by three respective screws Sc. Corresponding eyes on the base plate Gp thereby guarantee a slight spacing of the plate Gp from the precision coaxial collet chuck which spacing, for example, is dimensioned to be approximately 1 mm so that a pinching of dust particles in the gap can be reliably avoided.

Figure 4:
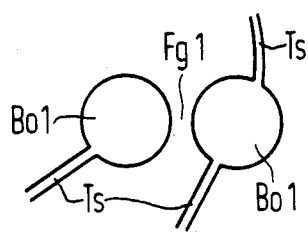
FIG. 4 illustrates the single-piece connection of a first spring joint to the neighboring parts of the coaxial collet chuck.
Figure 5:
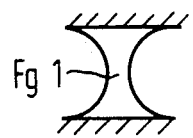
FIG. 5 is an illustration of the contour of the first spring joint of FIG. 4.

It may be seen from FIGS. 1 and 4, that the first spring joints Fg1 are formed by two bores Bo1 introduced into the common plate, whereby the corresponding parting slots Ts discharge into these bores Bo1 at one of their ends. The contour of a first spring joint Fg1 fashioned in this way is then schematically shown in FIG. 5.

Figure 6:
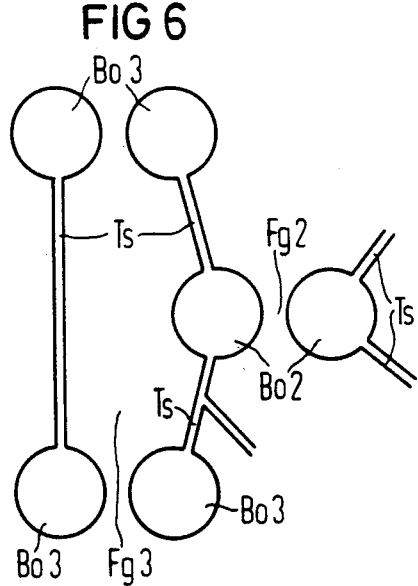
FIG. 6 illustrates the single-piece connection of a second and of a third spring joint to the neighboring parts of the coaxial collet chuck.
Figure 7:
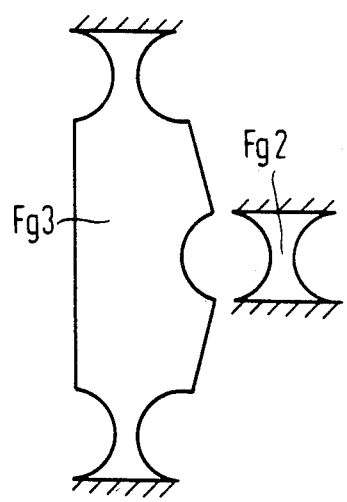
FIG. 7 is an illustration of the contour of the second and of the third spring joint of FIG. 6.

It may be seen from FIGS. 1 and 6 that the second spring joints Fg2 are formed by two bores Bo2 introduced into the common plate and that the third spring joints Fg3 are formed by four bores Bo3 introduced by pairs into the common plate, whereby the corresponding parting slots Ts have their opposite ends discharge into the bores Bo2 or, respectively, Bo3 in this case. The contours of second and third spring joints Fg2 and Fg3 formed in this way are then schematically shown in FIG. 7.

Figure 2:
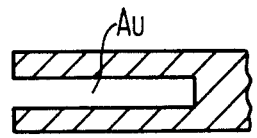
FIG. 2 is a section through the common plate of the precision coaxial collet chuck shown in FIG. 1, namely, a section in the region of a second and of a third spring joint which illustrates the upper and lower individual joints formed by a recess.

It proceeds from FIGS. 1 and 2 that the thickness of the second spring joints Fg2 and the third spring joints Fg3 are respectively divided into upper and lower individual joints by the recesses or cut outs Au introduced into the common plate. This division of the second and third spring joints Fg2 and Fg3 leads to flatter spring characteristics given approximately the same stability properties of the overall joints.

In accord with FIG. 1, an actuation lever Bh projecting outwardly in a radial direction is applied to the set collar Sr, the range of motion of this actuation lever Bh being limited by two laterally arranged detents or stop members As. The clamping force of the precision coaxial collet chuck is exerted by a spring Fd affixed to the actuation lever Bh, the other end of this spring Fd being secured to a support mount Hg1 connected to the base plate Gp. A potential pre-stress of all first, second and third spring joints Fg1, Fg2 and Fg3 can be compensated for by a second cooperating spring Gf affixed to the other side of the actuation lever Bh, the other end of this cooperating spring Gf being secured to a support mount Hg2 connected to the base plate Gp.

The above-described precision coaxial collet chuck forms a centering system with sub-micrometer precision. Given practical application in, for example, the framework of producing monomode plug-type connections, the fiber cores which are only a few micrometers thick can be adjusted with a precision of 0.1 mm relative to the plug pins which are about 2 mm thick.

Although the teachings of my invention have herein been discussed with reference to specific theories and embodiments, it is to be understood that these are by way of illustration only and that others may wish to utilize my invention in different designs or applications.

What is claimed is:

1. In a coaxial collet chuck having at least two clamping jaws adjustable and moveable in common in a radial direction, and means for moving the jaws radially, the improvement comprising:

said means including a separate chuck lever (Sh) connected to each of said clamping jaws (Sb) at a point intermediate the ends of each of said chuck levers (Sh);

said chuck levers (Sh) each being connected to a respective stationary base part (Bt) by a first spring joint (Fg1) on a first end of each of said chuck levers;

said chuck levers (Sh) each being hinged to a set collar (Sr) by a second spring joint (Fg2) for common clamping and releasing of said clamping jaws (Sb) on a second end of each of said chuck levers opposite said first end;

said set collar (Sr) being respectively rotatably seated at each of said stationary base parts (Bt) by a third spring joint (Fg3);

whereby all of said chuck levers (Sh), stationary base parts (Bt), first, second and third spring joints (Fg1, Fg2, Fg3) as well as said set collar (Sr) are fashioned of one piece from a common plate.

2. In a coaxial collet chuck according to claim 1, wherein each of the clamping jaws (Sb) has means for firmly fixing a hard metal insert (He) to one side of a portion of said clamping jaw Sb) which portion is reduced in thickness from the remainder of the common plate.

3. In a coaxial collet chuck according to claim 1, wherein each of said base parts (Bt) are screwed rigidly to a base plate (Gp) by screws and, and are arranged at predetermined distances therefrom.

4. In a coaxial collet chuck according to claim 1, wherein said chunk levers (Sh), said base parts (Bt), said first, second and third spring joints (Fg1, Fg2, Fg3) as well as said set collar (Sr) are separate from one another in said common plate by parting slots (Ts).

5. In a coaxial collet chuck according to claim 4, wherein each of said first spring joints (Fg1) is formed by material of the plate extending between two bores (Bo1) which are provided in said common plate.

6. In a coaxial collet chuck according to claim 5, wherein each of said second spring joints (Fg2) is formed by material of the plate extending between two other bores (Bo2) which are provided in said common plate.

7. In a coaxial collet chuck according to claim 6, wherein each of said third spring joints (Fg3) is formed by material of the plate extending between four additional bores (Bo3) which are arranged in pairs and are provided in said common plate.

8. In a coaxial collet chuck according to claim 7, wherein said second spring joints (Fg2) and said third spring joints (Fg3) are respectively divided into upper and lower individual joints by recesses (Au) which are provided in said common plate in a region of the second and third spring joints.

9. In a coaxial collet chuck according to claim 1, wherein an actuation lever (Bh) is attached to said set collar (Sr) the range of motion of said actuation lever being limited by laterally arranged stop members (As).

10. In a coaxial collet chuck according to claim 9, wherein a clamping force is exerted on the chuck lever by a first spring (Ft) urging said actuation lever (Bh) in a first direction toward one of the stop members.

11. In a coaxial collet chuck according to claim 10, wherein a potential pre-stress of all first, second and third spring joints (Fg1, Fg2, Fg3) can be compensated for by a second cooperating spring (Gf) urging said actuation lever (Bh) in a direction opposite to the first direction.

12. In a coaxial collet chuck according to claim 1, wherein the set collar (Sr) has a rotational center, and each chuck lever (Sh) has a curved shape so that the first spring joint (Fg1) and the second spring joint (Fg2) allocated for each lever lies at least approximately on a straight line extending through the rotational center.

* * * * *